United States Patent [19]

Hyodo

[11] Patent Number: 4,766,971
[45] Date of Patent: Aug. 30, 1988

[54] CONSTANT-SPEED RUNNING CONTROL DEVICE

[75] Inventor: Hitoshi Hyodo, Okazaki, Japan

[73] Assignee: Aisin Seiki Kabushiki Kaisha, Kariya, Japan

[21] Appl. No.: 917,563

[22] Filed: Oct. 10, 1986

[30] Foreign Application Priority Data

Oct. 11, 1985 [JP] Japan .................. 60-227474

[51] Int. Cl.$^4$ ............................. B60K 31/00
[52] U.S. Cl. ..................... 180/178; 123/360; 123/198 D
[58] Field of Search ............. 180/170, 175, 176, 177, 180/178, 179; 123/360, 362, 366, 198 D

[56] References Cited

U.S. PATENT DOCUMENTS 4,540,060 9/1985 Kawata et al. .................. 180/179

FOREIGN PATENT DOCUMENTS 0012140 1/1984 Japan .................. 180/179

Primary Examiner—John J. Love
Assistant Examiner—Richard Camby
Attorney, Agent, or Firm—Sughrue, Mion, Zinn, Macpeak & Seas

[57] ABSTRACT

A constant-speed running control device is provided, which comprises car speed detecting means for detecting the current car speed of a vehicle, memory means for storing a given car speed, an actuator for controlling a throttle valve, setting means for causing the memory means to store the given car speed, releasing means for releasing the control of the actuator, electronic control means for controlling the actuator in such a direction as to cause the difference between the stored car speed held in the memory means and the current car speed detected by the car speed detecting means to disappear, temperature detecting means, and low-temperature release means for actuating the releasing means in response to the output of the temperature detecting means, whereby the control of the actuator is released through the releasing means when an ambient temperature lowers to thereby prevent erroneous operation and enhance reliability.

7 Claims, 2 Drawing Sheets

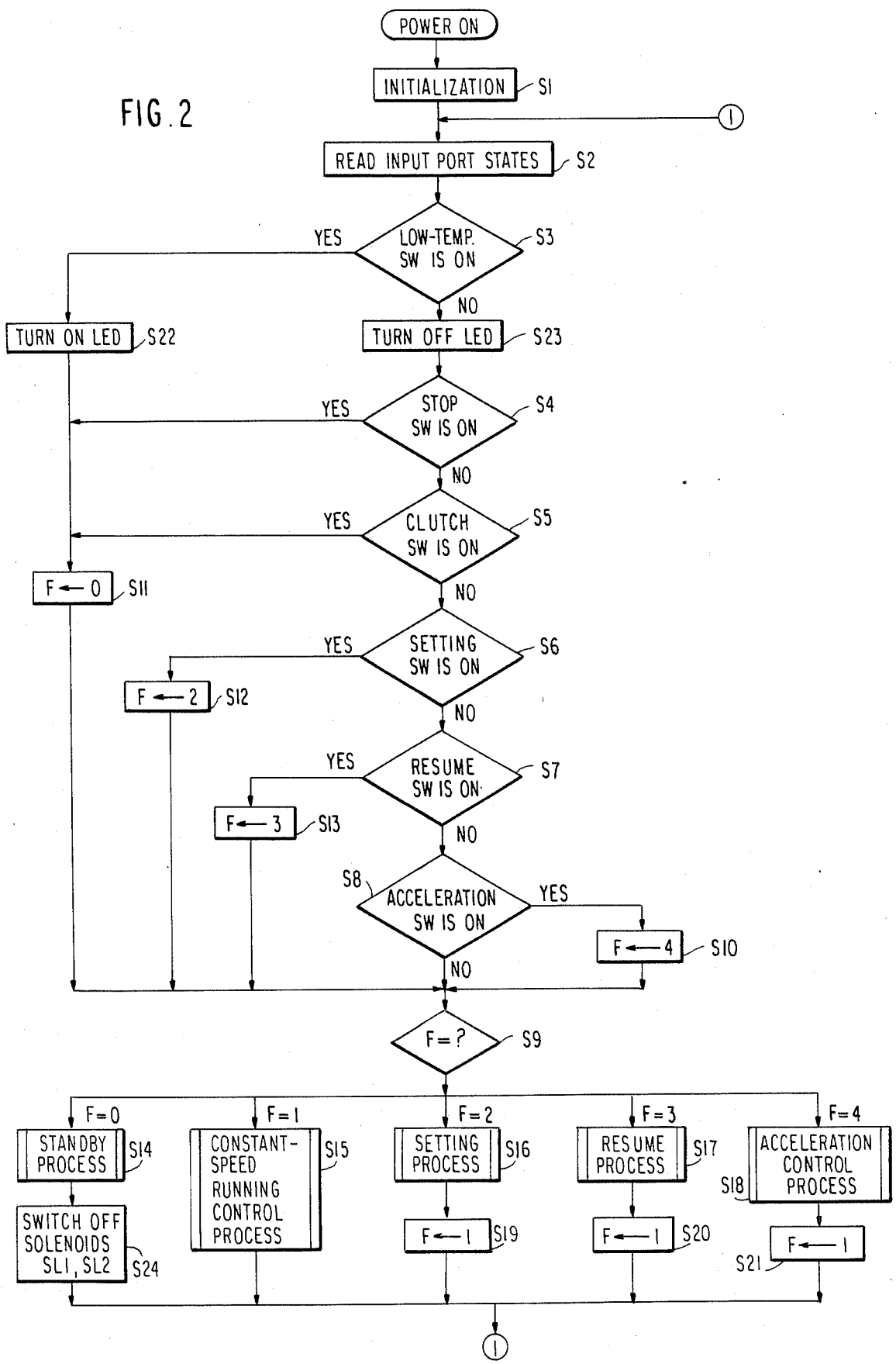

CONSTANT-SPEED RUNNING CONTROL DEVICE

BACKGROUND OF THE INVENTION

1. Field of the Invention

This invention relates to a constant-speed running control device which stores a given speed of a vehicle and maintains the vehicle automatically at the stored car speed and, more particularly, to the constant-speed running control device which includes a low-temperature release means for releasing, in response to actuation of a temperature switch means being actuated when an ambient temperature lowers, the control of an actuator means for controlling open/close of a throttle valve.

2. Description of the Prior Art

One conventional constant-speed running control device operates in such a manner that its computer stores a given car speed, compares with the current car speed, and controls an actuator such that the difference between the two becomes zero, as a result, a constant-speed running control process is performed through open/close of a throttle valve attached to the actuator.

According to such a type as above of constant-speed running control device, however, if the surrounding temperature of a vehicle becomes abnormally low, the actuator means for controlling open/close of the throttle valve tends to effect defective operation owing to the hardening of a rubber member included in the actuator means, the freezing of a wire for coupling together the actuator means and the throttle valve, and the like.

SUMMARY OF THE INVENTION

It is an object of the present invention to provide a constant-speed running control device which releases the control of an actuator means when an ambient temperature lowers.

To achieve the foregoing object, the present invention provides a constant-speed running control device comprising car speed detecting means for detecting the current car speed of a vehicle, memory means for storing a given car speed, an actuator for controlling a throttle valve, setting means for causing the memory means to store the given car speed, releasing means for releasing the control of the actuator, electronic control means for controlling the actuator in such a direction as to cause the difference between the stored car speed held in the memory means and the current car speed detected by the car speed detecting means to disappear, temperature detecting means, and low-temperature release means for actuating the release means in response to the output of the temperature detecting means.

According to the foregoing configuration, when the ambient temperature lowers below a predetermined temperature the temperature detecting means is actuated and this actuation is transmitted to the low-temperature release means. The low-temperature release means releases the control of the actuator to thereby inhibit a constant-speed running control process. Thereby, defective operation and the like can be prevented beforehand from occurring that would otherwise occur when the ambient temperature lowers abnormally.

BRIEF DESCRIPTION OF THE DRAWINGS

FIG. 2 is a flowchart showing the operation of an electronic control unit.

DESCRIPTION OF THE PREFERRED EMBODIMENT

Figure 1:
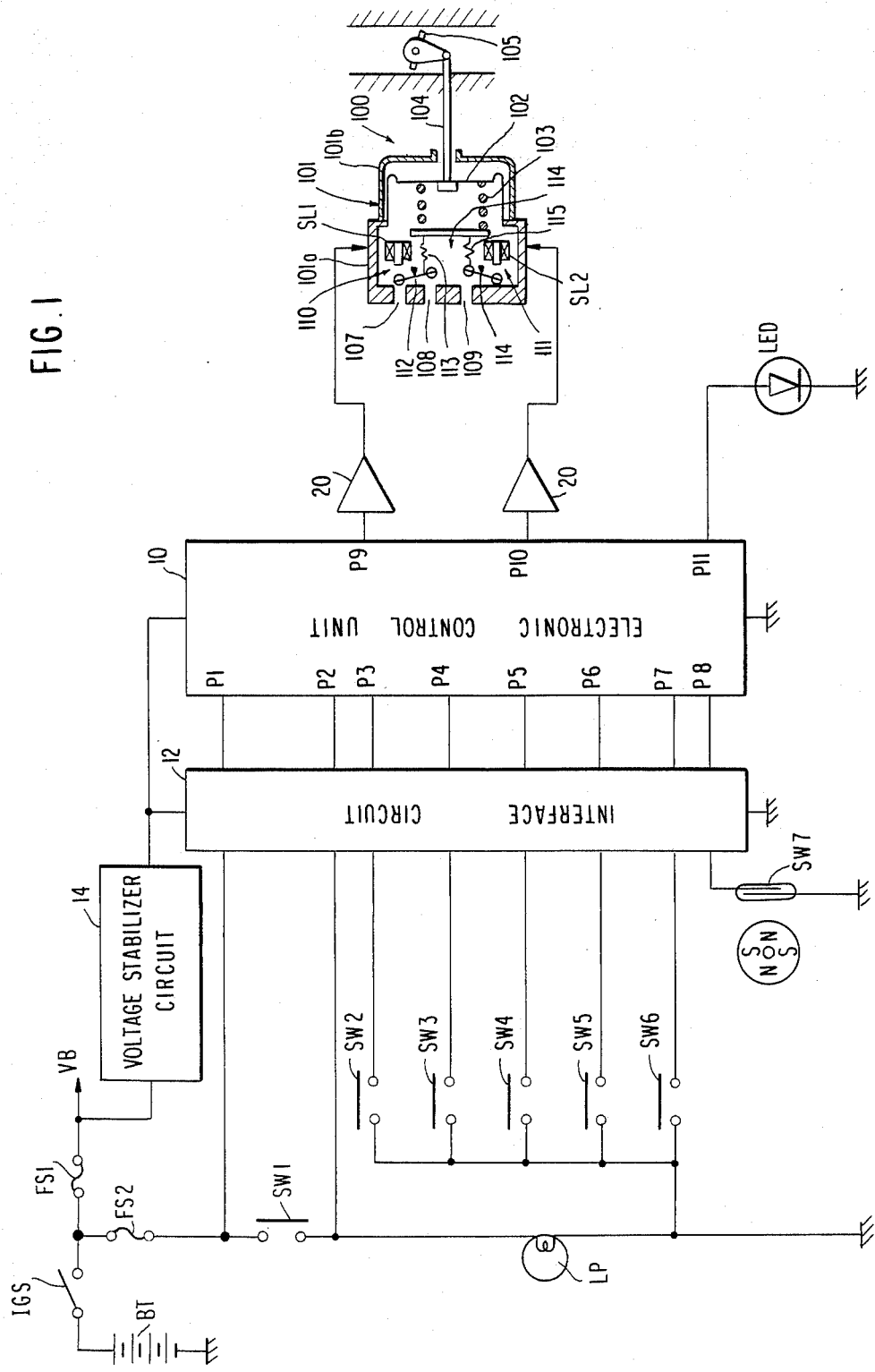
FIG. 1 is a block diagram showing an embodiment of the present invention.

An embodiment of the present invention will now be described with reference to the drawings. FIG. 1 shows an example of an electric circuit of a constant-speed running control device according to the present invention.

In FIG. 1, the power of the circuit is supplied from a car battery BT through an ignition switch IGS and a fuse FS1 to a voltage stabilizer circuit 14. This voltage stabilizer circuit 14 generates a stable voltage of 5 volts from the power thus supplied and applies the generated voltage to an electronic control unit 10 and an interface circuit 12.

In the embodiment, the electronic control unit 10 is realized by a micro computer.

A switch SW1 is a stop switch responsive to manipulation of a brake pedal, a switch SW2 is a clutch switch responsive to manipulation of a clutch pedal, and as either of these two switches is actuated, a constant-speed running control process is released or cancelled, A switch SW3 is a setting switch for constant-speed running, that is, as this setting switch SW3 is manipulated, a given car speed is stored and the constant-speed running control process is commenced.

A switch SW4 is a resume switch for constant-speed running, that is, as this resume switch SW4 is manipulated, the constant-speed running control process is commenced at the car speed stored before the beginning of the constant-speed running control process.

A switch SW5 is an acceleration switch for increasing the stored car speed being used at the time of constant-speed running, that is, the stored car speed is increased in response to manipulation of this acceleration switch SW5, the value thus increased is stored when the acceleration switch SW5 is returned, and then the constant-speed running control process is commenced.

A switch SW6 is a temperature switch being actuated when the ambient temperature lowers, that is, as this temperature switch SW6 is actuated, the constant-speed running control process is released.

Although several locations can be adopted as the spot where the temperature switch SW6 is attached, it is preferably provided in the vicinity of an actuator 100.

A switch SW7 is a reed switch for detection of the car speed, hence, a permanent magnet connected to a speed meter cable is disposed in the vicinity of this car speed detecting reed switch SW7.

One end of the stop switch SW1 is connected through a fuse FS2 to the ignition switch IGS with the other end grounded through a stop lamp LP. Both ends of the stop switch SW1 are connected through the interface circuit 12 to input ports P1 and P2 of the electronic control unit 10.

One end of the clutch switch SW2 is connected through the interface circuit 12 to an input port P3 of the electronic control unit with the other end grounded.

One end of the setting switch SW3 is connected through the interface circuit 12 to an input port P4 of the electronic control unit with the other end grounded.

One end of the resume switch SW4 is connected through the interface circuit 12 to an input port P5 of the electronic control unit with the other end grounded.

One end of the acceleration switch SW5 is connected through the interface circuit 12 to an input port P6 of the electronic control unit with the other end grounded.

One end of the temperature switch SW6 is connected through the interface circuit 12 to an input port P7 of the electronic control unit with the other end grounded.

One end of the reed switch SW7 is connected through the interface circuit 12 to an input port P8 of the electronic control unit with the other end grounded.

Output ports P9 and P10 of the electronic control unit 10 are connected through solenoid drive circuits 20 to solenoids SL1 and SL2, respectively.

An output port P11 of the electronic control unit 10 is connected with an LED which is turned on when a lowtemperature release means is actuated.

The negative-pressure actuator 100 is configured as follows: A housing 101 is made up of two housing parts 101a and 101b. A diaphragm 102 is pinched between flange portions of the housing parts 101a and 101b. A space surrounded by the diaphragm 102 and the housing part 101a defines a negative-pressure chamber, whereas another space surrounded by the diaphragm 102 and the housing part 101b is communicated with the atmosphere. Between the housing part 101a and the diaphragm 102 is interposed a compression coil spring 103 which pushes back the diaphragm 102 rightward as viewed in the drawing when the pressure inside the negative-pressure chamber becomes close to the atmospheric pressure. A lever 104 secured nearly to the center of the diaphragm 102 is coupled with the ring of a throttle valve 105. The housing part 101a is formed with a negative-pressure intake port 107 communicating with a negative-pressure source such as an intake manifold, and atmosphere intake ports 108 and 109.

Both a negative-pressure control valve 110 and a negative-pressure open valve 111 are provided in the housing part 101a. A movable segment 112 of the negative-pressure control valve 110 is tiltable whose one end is coupled with an extension coil spring 113 with the other end facing opposite the control solenoid SL1. Both ends of the movable segment 112 function as a valve member, and open/close the negative-pressure intake port 107 and close/open the atmosphere intake port 108 in response to energization/deenergization of the solenoid SL1.

Similarly to the negative-pressure control valve 110, the negative-pressure open valve 111 has a movable segment 114, an extension coil spring 115, and the solenoid SL2, but, this movable segment 114 closes/opens the atmosphere intake port 109.

At the time of constant-speed running control, the electronic control unit 10 compares the stored car speed with the current car speed and determines a duty ratio being used in controlling the control solenoids so as to make zero the difference between the two. If deceleration is necessary, the duty ratio is made small, that is, a time ratio at which the negative-pressure control valve 110 makes the inside of the negative-pressure actuator 100 communicate with the atmosphere is made large, as a result, the throttle valve is closed by the negative-pressure actuator 100. On the contrary, if acceleration is necessary, the duty ratio is made large, as a result, the throttle valve is opened by the actuator 100.

The operation of the micro computer serving as the electronic control unit 10 will now be described with reference to the flow chart shown in FIG. 2.

In step S1, initialization is performed, that is, the respective states of the input/output ports are set, a control flag is cleared, parameters are initialized, and similar processes are performed. Thereafter, in step S2, the respective states of the input ports P1 through P8 are read.

In step S3, judgment is done as to whether the low-temperature switch SW6 is ON or not. If it is not ON (that is, it is OFF), the LED is turned off in succeeding step S23 and control proceeds to step S4. If the low-temperaure switch SW6 is ON, the LED is turned on in step S22, and control proceeds to step S11 in which "0(zero)" is set in a control flag F and then to step S9.

In step S9, because the control flag indicates "0", control proceeds to step S14. In step S14, a standby process is performed, that is, the constant-speed running control process is released. Thereafter, in step S24, the solenoids SL1 and SL2 are switched off, and control returns to step S2.

In step S4, judgment is done as to whether the stop switch SW1 is ON or not. If it is not ON, control proceeds to step S5. If the stop switch SW1 is ON, similarly to the case the low-temperature switch SW6 is ON, in step S11, "0" is set in the control flag F. After passing through step S9 and performing the standby process in step S14, control returns to step S2.

In step S5, judgment is done as to whether the clutch switch SW2 is ON or not. If it is not ON, control proceeds to succeeding step S6. If the clutch switch SW2 is ON, similarly to the case the low-temperature switch SW6 is ON or the case the stop switch SW1 is ON, "0" is set in the control flag F in step S11. After passing through step S9 and performing the standby process in step S14, control returns to step S2.

Thus, the stop switch SW1 and the clutch switch SW2 act as cancel switches.

In step S6, judgment is done as to whether the setting switch SW3 is ON or not. If it is not ON, control proceeds to succeeding step S7. If the setting switch SW3 is ON, control proceeds to succeeding step S12. In step S12, "2" is set in the control flag F, and control proceeds to step S9. In step S9, because the control flag indicates "2", control proceeds to step S16. In step S16, a setting process is performed, that is, a given car speed is stored. Then, control proceeds to step S19.

In step S19, "1" is set in the control flag. Thus, unless the control flag is reset in other succeeding control loops, the constant-speed running control process of step S15 is performed forever.

In step S7, judgment is done as to whether the resume switch SW4 is ON or not. If it is not ON, control proceeds to succeeding step S8. If the resume switch SW4 is ON, control proceeds to step S13 in which "3" is set in the control flag F, and control proceeds to step S9. In step S9, because the control flag indicates "3", control proceeds to step S17. In step S17, a resume process is performed, that is, the constant-speed running control process previously set is released and a process of causing the car speed to revert to the previously-stored car speed is performed. Thereafter, "1" is set in the control flag F in step S20, and control returns to step S2.

In step S8, judgment is done as to whether the acceleration switch SW5 is ON or not. If it is not ON, control proceeds to step S9, after this step a process corresponding to the indication of the control flag lately set being performed. If the acceleration switch SW5 is ON, control proceeds to step S10 in which "4" is set in the control flag F, and control proceeds to step S9. In step S9, because the control flag indicates "4", control proceeds to step S18 in which an acceleration control process is performed, that is, the car speed is increased, a new car speed is stored, and a process commencing the constant-speed running control process is performed. Thereafter, "1" is set in the control flag F in step S21, and control returns to step S2.

As described above, according to the foregoing embodiment, when the ambient temperature lowers, this is detected by the temperature switch means, whereby the constant-speed running control process can be inhibited.

Further, in case the temperature switch means is actuated to inhibit the constant-speed running control process, this condition can be indicated. Thus, a driver can be informed of the fact that the constant-speed running control process has been inhibited because of a low-temperature state, and conversely, he can also be informed of the fact that such an inhibited state has been released.

For reference, during the constant-speed running control device being in operation, if the ambient temperature lowers to actuate the temperature switch means, the low-temperature release means releases the control of the actuator means to stop the operation of the constant-speed running control device, whereby the standby state can be brought. Thereafter, until the ambient temperature rises to terminate the actuated state of the temperature switch means, the control circuit maintains the standby state, hence, the constant-speed running control process is inhibited.

Although in the foregoing embodiment the standby process is put in operation if the low-temperature switch is actuated, such a control process may be modified so as to perform the initialization process of step S1. Further, the electronic control unit should not be limited to the type realized by the micro computer.

As described hereinabove, according to the present invention, erroneous operation of the constant-speed running control device that would otherewise be caused owing to lowering of the ambient temperature can be prevented from occurring, and the reliability, particularly in a cold northern district, of the constant-speed running control device can be enhanced remarkably.

What is claimed is:

1. A constant-speed running control device comprising car speed detecting means for detecting the current cap speed of a vehicle,
   memory means for storing a given car speed,
   an actuator for controlling a throttle valve,
   setting means for causing said memory means to store the given car speed,
   releasing means for releasing the control of said actuator,
   electronic control means for controlling said actuator in such a direction as to cause the difference between the stored car speed held in said memory means and the current car speed detected by said car speed detecting means to disappear,
   temperature detecting means, and
   low-temperature release means for actuating said releasing means in response to the output of said temperature detecting means, wherein said low-temperature release means actuates said releasing means when the temperature detected by said temperature detecting means becomes lower than a predetermined level.

2. A constant-speed running control device according to claim 1, further including indicator means for indicating actuation of said low-temperature release means.

3. A constant-speed running control device according to claim 2, wherein said indicator means is a light emitting diode.

4. A constant-speed running control device according to claim 1, wherein said setting means is actuated in response to manipulation of a setting switch.

5. A constant-speed running control device according to claim 1, wherein said releasing means is actuated in response to manipulation of a stop switch and a clutch switch.

6. A constant-speed running device comprising;
   car speed detecting means for detecting the current car speed of a vehicle;
   memory means for storing a given car speed;
   an actuator for controlling a throttle valve;
   setting means for causing said memory means to store the given car speed;
   electronic control means for controlling said actuator in such direction as to cause the difference between the stored car speed held in said memory means and the current car speed detected by said car speed detecting means to disappear;
   temperature detecting means;
   cancel switch means for cancelling the control of said electronic control means; and
   releasing means for releasing the control of said actuator in accordance with said temperature detecting means and said cancel switch means, wherein said releasing means operates when the temperature detected by said temperature detecting means becomes lower than a predetermined level.

7. A constant-speed running device comprising;
   car speed detecting means for detecting the current car speed of a vehicle;
   memory means for storing a given car speed;
   an actuator for controlling a throttle valve;
   setting means for causing said memory means to store the given car speed;
   electronic control means for controlling said actuator in such direction as to cause the difference between the stored car speed held in said memory means and the current car speed detected by said car speed detecting means to disappear;
   temperature detecting means;
   cancel switch means for cancelling the control of said electronic control means; and
   releasing means for releasing the control of said actuator in accordance with said cancel switch means and said temperature detecting means when the temperature detected by said temperature detecting means becomes lower than a predetermined level, wherein said cancel switch means further comprises;
   a stop switch turning on in accordance with manipulation of brake pedal;
   a clutch switch turning on in accordance with manipulation of clutch pedal; and
   said cancel switch means cancelling the control of said electronic control means when at least one of said switches turn on.

* * * * *